United States Patent [19]

Phelps et al.

[11] Patent Number: 4,782,901

[45] Date of Patent: * Nov. 8, 1988

[54] MINIMIZING GRAVITY OVERRIDE OF CARBON DIOXIDE WITH A GEL

[75] Inventors: Craig H. Phelps; Krishnaswamy Sampath, both of Carrollton, Tex.

[73] Assignee: Mobil Oil Corporation, New York, N.Y.

[*] Notice: The portion of the term of this patent subsequent to May 22, 2004 has been disclaimed.

[21] Appl. No.: 941,136

[22] Filed: Dec. 12, 1986

[51] Int. Cl.[4] .................... E21B 33/138; E21B 43/22
[52] U.S. Cl. ................................. 166/270; 166/272; 166/274; 166/295
[58] Field of Search ............... 166/270, 264, 273, 274, 166/272, 292, 294, 295, 303, 300

[56] References Cited

U.S. PATENT DOCUMENTS

| | | | |
|---|---|---|---|
| Re. 30,767 | 10/1981 | Felder et al. | 166/294 X |
| 3,208,524 | 9/1965 | Horner et al. | 166/294 |
| 3,227,212 | 1/1966 | Black et al. | 166/294 |
| 3,243,000 | 3/1966 | Patton et al. | |
| 3,301,848 | 1/1967 | Halleck | |
| 3,305,016 | 2/1967 | Lindblom et al. | |
| 3,373,812 | 3/1968 | Smith | 166/295 X |
| 3,554,287 | 1/1971 | Eilers et al. | 523/130 X |
| 3,599,433 | 8/1971 | Murata et al. | 523/130 X |
| 3,687,200 | 8/1972 | Routson | 166/295 X |
| 3,908,760 | 9/1975 | Clampitt et al. | 166/246 |
| 3,927,716 | 12/1975 | Burdyn et al. | 166/270 |
| 4,147,211 | 4/1979 | Sandiford | 166/294 X |
| 4,399,866 | 8/1983 | Dearth | 166/292 X |
| 4,428,429 | 1/1984 | Felber et al. | 166/294 |
| 4,470,462 | 9/1984 | Hutchison | 166/292 |
| 4,513,821 | 4/1985 | Shu | 166/273 |
| 4,548,268 | 10/1985 | Stipanovic | 166/270 |
| 4,574,887 | 3/1986 | Abdo | 166/246 X |
| 4,582,137 | 4/1986 | Schmitt | 166/270 |
| 4,613,631 | 9/1986 | Espenscheid et al. | 523/130 |
| 4,667,741 | 5/1987 | Phelps et al. | 166/274 |

Primary Examiner—George A. Suchfield
Attorney, Agent, or Firm—Alexander J. McKillop; Michael G. Gilman; Charles A. Malone

[57] ABSTRACT

A process for minimizing gravity override via carbon dioxide combined with a sized gel. A polysaccharide gel of a size sufficiently greater than the pores contained in a more permeable formation area is prepared ex situ in the presence of sodium hydroxide. Said gel is then pumped into said formation causing pores in the more permeable formation area to be blocked off. Thereafter, carbon dioxide flooding is commenced and said flood is directed into the less permeable formation area causing hydrocarbonaceous fluids to be produced therefrom.

26 Claims, 2 Drawing Sheets

MINIMIZING GRAVITY OVERRIDE OF CARBON DIOXIDE WITH A GEL

This application is related to application Ser. No. 767,571 filed on Aug. 20, 1985 now U.S. Pat. No. 4,667,741 which issued on May 26, 1987.

FIELD OF THE INVENTION

This invention relates to a process for recovering oil from a subterranean, viscous oil-containing formation. More particularly, this invention relates to a method of recovering oil wherein a zone of greater permeability in said formation is closed by a gel and oil is subsequently displaced from a zone of lesser permeability by carbon dioxide.

BACKGROUND OF THE INVENTION

In the recovery of oil from oil-containing formations, it usually is possible to recover only minor portions of the original oil in-place by the so-called primary recovery methods which utilize only the natural forces present in the formation. Thus, a variety of supplemental recovery techniques have been employed in order to increase the recovery of oil from subterranean formations. These techniques include thermal recovery methods, waterflooding, and miscible flooding.

More recently, carbon dioxide has been used successfully as a miscible oil recovery agent. Carbon dioxide is a particularly desirable material because it is highly soluble in oil, and dissolution of carbon dioxide in oil causes a reduction in the viscosity of the oil thereby increasing the volume of oil, all of which improve the recovery efficiency of the process. Carbon dioxide is sometimes employed under non-miscible conditions, and in certain reservoirs it is possible to achieve a condition of miscibility at reservoir temperature and pressure between essentially pure carbon dioxide and the reservoir oil.

Where carbon dioxide is used in a formation having swept and unswept zones, the swept zone will create a situation where carbon dioxide does not contact oil contained in the unswept zone. The carbon dioxide thus has a tendency to override the unswept zone leaving behind oil contained in the unswept zone.

To overcome this situation, a method is needed which will close pores in the swept zone which has been contacted with carbon dioxide and thereafter divert carbon dioxide to the unswept zone which has not been contacted so as to remove hydrocarbonaceous material therefrom.

SUMMARY OF THE INVENTION

The present invention is directed to a method for minimizing carbon dioxide gravity override during the recovery of oil from a subterranean, viscous oil-containing formation having swept and unswept zones penetrated by at least one injection well and at least one spaced-apart production well and having fluid communication therebetween. An aqueous polysacccharide gel formed in combination with a substantially small amount of an alkali or alkaline earth metal hydroxide and a polyvalent metal ion is injected into the swept zone within said formation. Said gel is allowed to become of a size sufficient to close the pores in the swept zone. After said pores are closed, the unswept zone containing overridden hydrocarbons, is contacted with carbon dioxide for a time sufficient to become miscible with the hydrocarbonaceous fluid within said unswept zone.

It is therefore an object of this invention to inject into a swept zone previously contacted with carbon dioxide, a gel formed by placing a polysaccharide into a solution containing an alkali or alkaline earth metal hydroxide and a polyvalent metal ion.

It is a further object of this invention to form said gel with sodium hydroxide to obtain quicker and more efficient gelation.

It is a yet further object of this invention to reduce the quantity of polyvalent metal ions required for gel complexing which results in a quicker gelation time enabling a speedier injection of gel into the field.

It is a still further object of this invention to quickly make gels of greater stability.

It is a yet still further object of this invention to effect a cost savings by decreasing the volume of carbon dioxide required in a carbon dioxide sweep process.

It is a still yet further object of this invention to obtain increased yields of hydrocarbonaceous fluids.

DESCRIPTION OF THE PREFERRED EMBODIMENT

In the recovery of hydrocarbonaceous fluids from an underground reservoir, a carbon dioxide oil recovery process is often used. A carbon dioxide process which can be used is disclosed in U.S. Pat. No. 4,513,821 which issued to W. R. Shu on Apr. 30, 1985 and which is hereby incorporated by reference.

Figure 1:
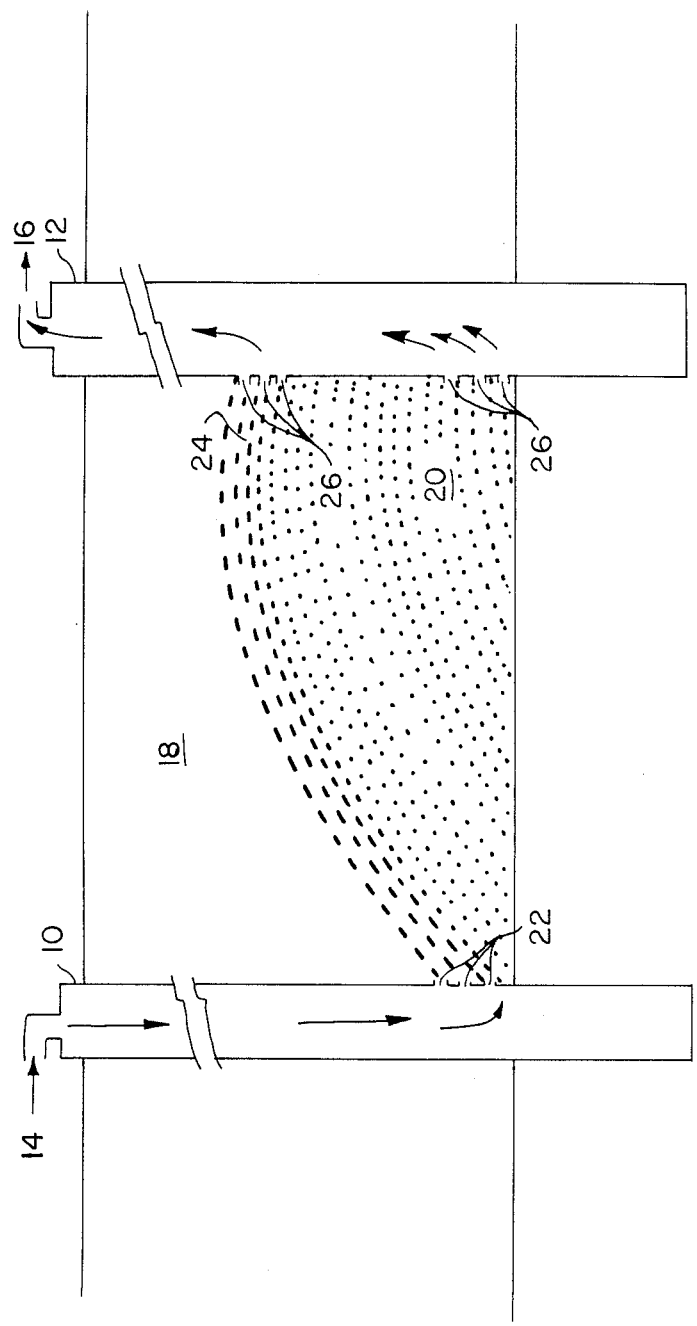
FIG. 1 is a schematic illustration showing swept and unswept zones of a formation penetrated by injection and production wells during a carbon dioxide sweep.

As shown in FIG. 1, injection well 10 penetrates a hydrocarbonaceous fluid bearing formation containing unswept zone 18 and swept zone 20 thereby creating a carbon dioxide override situation. Carbon dioxide enters injection 10 well via line 14 and proceeds into swept zone 20 by perforations 22 in injection well 10. The carbon dioxide becomes miscible with hydrocarbonaceous fluids in the swept zone 20. Resultant hydrocarbonaceous fluids from zone 20 are combined with carbon dioxide and exit zone 20 via perforations 26 into production well 12 into line 16 where said fluids and carbon dioxide are separated and recovered.

Once recovery of hydrocarbonaceous fluids from swept zone 20 has been terminated, a polysaccharide gel is injected into injection well 10 via line 14. Said gel enters swept zone 20 via perforations 22. By using a core sample obtained from zone 20 as an indicator of pore size within said zone, said gel, which is formed ex situ, is allowed to become a size sufficient to plug pores in swept zone 20. After said gel has penetrated into and closed the pores in zone 20, said gel is allowed to solidify Behavior of gels in permeable zones of a formation is also discussed in U.S. Pat. No. 3,908,760 issued to Clampitt et al. on Sept. 30, 1975. This patent is hereby incorporated by reference.

Figure 2:
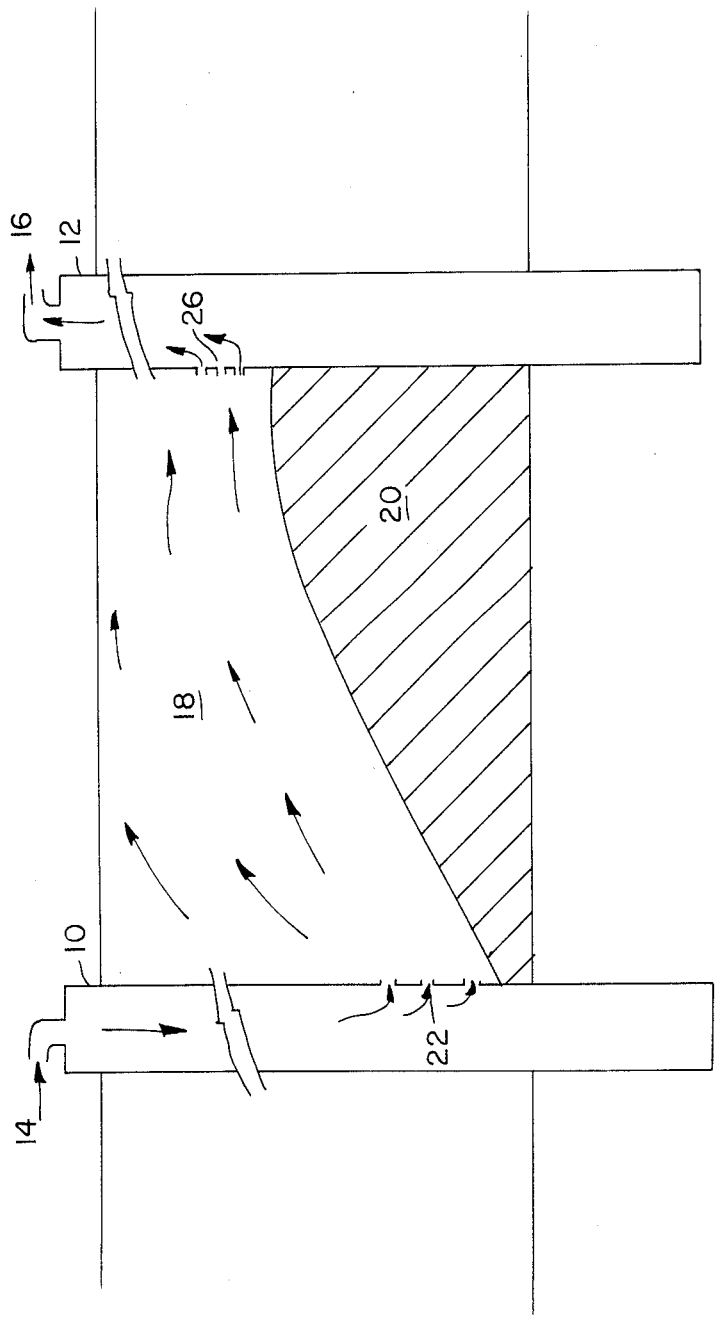
FIG. 2 is a schematic illustration where the carbon dioxide swept zone has been closed by a gel and hydrocarbonaceous fluids are removed from a previously unswept zone.

After solidification, carbon dioxide is injected into injection well 10 via line 14 where via perforations 22 it enters overridden zone 18 which contains hydrocarbonaceous fluids. This process is shown in FIG. 2. Carbon dioxide becomes miscible with said fluids in unswept zone 18. Said fluids and carbon dioxide are then removed from zone 20 via perforations 26 into production well 12. Here, said fluids and carbon dioxide are removed from production well 12 via line 16. After exiting line 16, said fluids and carbon dioxide are separated and recovered. Recovered carbon dioxide can be recycled into said formation to recover additional hydrocarbonaceous fluids.

The gel which is injected into injection well 12 is contained in a fluid medium. Said gel comprises water having incorporated therein an amount of an alkali or alkaline earth metal hydroxide suitable to cause a thickening and gelation of a biopolysaccharide or polysaccharide containing a polyvalent metal ion. Placement of the alkali or alkaline earth metal hydroxide into the water causes quicker gelation of said polysaccharides than heretofore obtainable. A method for preparing these gels is discussed in U.S. Pat. No. 4,574,887 which issued to Abdo on Mar. 11, 1986. This patent is hereby incorporated by reference.

Gels disclosed herein can also be utilized in a profile control process for recovering petroleum or other hydrocarbonaceous fluids from a formation having distinct multiple permeable strata. After hydrocarbonaceous fluids have been removed from the more permeable stratum, the more permeable stratum is plugged with the novel gels disclosed herein. Once the more permeable stratum has been plugged, a carbon dioxide, waterflood or other desirable oil recovery process can be utilized to recover said fluids from the less permeable stratum. As is known to those skilled in the art, any suitable well pattern may be utilized. Suitable well patterns are disclosed in U.S. Pat. No. 3,927,716 issued to Burydn et al. This patent is hereby incorporated by reference herein. A profile control process cn be utilized as disclosed by Schmitt U.S. Pat. No. 4,582,137 which issued on Apr. 15, 1986. This patent is hereby incorporated by reference.

Alkali or alkaline earth metal hydroxides which will work in the method of this invention include those of a member selected from a group consisting of sodium hydroxide, potassium hydroxide and calcium hydroxide. Said alkali or alkaline earth metal hydroxide is contained in said water in amount of from about 10 ppm to about 500 ppm preferably about 100 ppm. Although it is possible to add the alkali or alkaline earth metal hydroxide to the water after the introduction of the biopolysaccharide or polysaccharide, best results have been obtained when said hydroxide is added to said water prior to the introduction of said polysaccharides. Addition of the hydroxide in this manner allows for the formation of gels for use in subterranean environments, such as low pH brines.

The hydroxide, biopolysaccharide or polysaccharide, and polyvalent ions are generally mixed at ambient temperatures. Although no upper and lower temperature ranges have been designated, temperatures encountered have varied from about $-4°$ F. ($16°$ C.) to about $130°$ F. ($54°$ C.).

The contemplated polyvalent metal ion selected for utilization herein is a member selected from the group consisting of phosphorus, scandium, titanium, vanadium, chromium, manganese, iron, cobalt, copper, aluminum, arsenic, yttrium, zirconium, niobium, cadmium, tin, antimony, lanthanum, hafnium, tantalum, lead and mixtures thereof. Particularly preferred polyvalent metal ions are of chromium and titanium. A preferred utility for the polyvalent metal ion complex defined above is as a thickening or gelation agent for aqueous liquids for employment in oil recovery generally.

Examples of water soluble polyvalent metal compounds which can be the precursor for the subject metal ions are phosphorous thiobromide, scandium nitrate, titanium tetrachloride, vanadium tribromide, chromium dichloride, manganese diiodide, iron bromide hexahydrate, cobalt chloride dihydrate, copper perchlorate, aluminum bromide hexahydrate, arsenic pentafluoride, yttrium bromide, zirconium tetrachloride, niobium oxychloride, cadmium iodate, tin dibromide diiodide, antimony trioxide, lanthanum chloride, hafnium oxychloride, tantalum fluoride, lead chlorate and mixtures thereof. These metal compounds are added to the mixture in an amount of from about 10 to about 1000 ppm of the active metal ion, preferrably about 40 to about 200 ppm. It is preferred to add said saccharide to the mixture prior to introducing the polyvalent ion.

In preparing the thickened aqueous liquid according to the present invention, either fresh or saline water can be employed. By fresh water is meant either distilled water, deionized water or water containing a comparatively low, i.e. less than 30,000 parts per million, dissolved salts. By saline water is meant water containing more than about 30,000 parts per million dissolved salts.

The polysaccharide gel used in accordance with the present invention is preferably a water-soluble biopolysaccharide produced by the action of bacteria of the genus Xanthomonas on a carbohydrate. Of course, as is known by those skilled in the art, other polysaccharides will work. Xanthomonas polysaccharides and their methods of preparation are well known to those skilled in the art, as disclosed, for example, in Lindblom et al. U.S. Pat. No. 3,305,016 and in Patton et al. U.S. Pat. No. 3,243,000, the entire disclosures of which are expressly incorporated herein by reference. Representative species of the genus Xanthomonas which may be employed to produce polysaccharides include *Xanthomonas begoiae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum,* and *Xanthomonas vesicatoria.* A particular polysaccharide which is commerically available and is preferred for use in the present invention is the ionic polysaccharide B-1459 produced by fermentation of glucose with the bacterium *Xanthomonas campestris* NRRL B-1459, U.S. Department of Agriculture. This polysaccharide is produced by culturing the bacterium *Xanthomonas campestris* in a well aerated medium having a pH of about 7 which contains commercial glucose organic nitrogen sources, dipotassium hydrogen phosphate and appropriate trace elements. This polymer is available from the Kelco Chemical Company under the trade name "Kelzan", or from Pfizer Chemical a Division of Pfizer, Inc. Of course, as is known to those skilled in the art, Alcaligenes may be used also. Said Alcaligenes can be purchased from Kelco Chemical Company, a Division of Merck Incorporated under the S-130 tradename.

The resultant viscous liquid may contain from about 1,000 to about 15,000 ppm of a Xanthomonas polysaccharide and from about 10 to 1,000 ppm of $Cr^{3+}$. A preferred narrower range is from about 1,500 to about 4,000 ppm of Xanthomonas polysaccharide per from about 20 to 400 ppm of $Cr^{3+}$. For example, about 2,000 ppm of Xanthomonas polysaccharide may be complexed with from about 10 to about 200 ppm of $Cr^{3+}$.

Other polysaccharides, e.g. scleroglucan and its derivatives may be utilized in the process of this invention. They are disclosed in U.S. Pat. No. 3,301,848 which issued on Jan. 31, 1967. This patent is incorporated by reference herein.

The invention also comprises a method of preparing the polysaccharide/polyvalent metal ion complex defined above comprising dissolving said polysaccharide in water containing designated amounts of a hydroxide of an alkali or alkaline earth metal and adding thereafter a water-soluble polyvalent metal compound thereto.

By utilizing an alkali or alkaline earth metal hydroxide, a thickened gel of a polysaccharide complexed with a polyvalent metal ion is formed within a shorter time period. The reaction between said metal hydroxide and the polyvalent metal ion is more efficient which decreases the amount of polyvalent metal ion utilized. This results in a quicker forming gel having substantially greater stability characteristics.

The invention is further amplified when the following examples are considered.

Two solutions containing 2,000 ppm each of polysaccharide broths sold under the Pfizer 4800 and Kelco Kelzan VCB tradenames were prepared. These polymers are available from Pfizer, Inc. and Kelco Company, a division of Merck Incorporated, respectively. These solutions were prepared in Synthetic Salt Creek Water ("SSCW"). SSCW containing 62,000 ppm of sodium chloride was utilized to simulate salt water found in a formation under inspection for the production of hydrocarbonaceous fluids. A water soluble chromium compound sufficient to release 70 and 80 ppm of chromic ions was added to the respective samples. No sodium hydroxide or other hydroxide of an alkali or alkaline earth metal was added Rapid gelation did not occur.

Next two samples containing 2,000 ppm of Pfizer 4800 each were mixed with SSCW containing 100 ppm of sodium hydroxide. Subsequently, a polyvalent metal compound in a quantity sufficient to release about 80 ppm of active trivalent chromic ions was added to the respective solutions.

Similarly, two samples of Kelco Kelzan VCB were prepared which contained 2,000 ppm of the biopolysaccharide. The samples were treated in a manner similar to the Pfizer 4800 samples except active chromic ions were added in about 60 and 80 ppm quantities respectively.

On the addition of about 80 ppm chromium ions, the Pfizer and Kelco broths formed gels rapidly, in about 1 to 3.5 hours. These gels were then sheared in a blender and the rehealing characteristics were observed. All the gels reformed quickly. The gels were then placed in an oven at 130° (54° C.) and observed. Gels prepared from the broths were still stable, after 5 weeks at 130° F. (54° C.). Gels formed using the Kelzan broth and 60 ppm chromium are also stable after 5 weeks, losing less than 10% of water.

Unreliable and unfavorable results were obtained from some broths. These results are not included herein below.

The results above where sodium hydroxide was utilized are shown below in Table 1.

TABLE 1

Gel Formation and Stability Test Results for 2,000 ppm Polymer Solution in Synthetic Salt Creek Water Treated with 100 ppm NaOH

| Broth | $CR^{+3}$ Concentration ppm | Initial Gelation Time, hrs. | Recovery after Shear | Stability at 130° F. (after 5 weeks) |
|---|---|---|---|---|
| Pfizer 4800 | 80 | 3 | Rapid | Good |
| Kelco Kelzan VCB | 60 | 3.5 | Rapid | Good |
| Kelco Kelzan VCB | 80 | 3.5 | Rapid | Good |

Other gels which can be made for utilization herein following the teachings of this invention include those made from furfuryl alcohol, polyvinyl pyrrolidone, sodium polysilicates, and other related polysilicates, epoxy-acrylic resins, and phenol formaldehyde resins.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for recovering hydrocarbonaceous fluid from a formation having at least two zones of different permeability comprising:
   (a) mixing into water a water thickening amount of a water soluble scleroglucan polysaccharide and a substantially small amount of an alkaline metal hydroxide sufficient to cause gelation within a substantially effective time period then;
   (b) complexing said polysacharide with an amount of water-soluble compound of a polyvalent metal ion sufficient to cause gelation of said polysaccharide thereby forming a stable gel;
   (c) injecting into a first zone of greater permeability said polysaccharide gel which gelates sufficiently to close pores in said first zone; and
   (d) injecting into a second zone of lesser permeability a fluid in an amount sufficient to remove hydrocarbonaceous fluids from said second zone which fluid is diverted from said first zone containing said closed pores.

2. The method as recited in claim 1 wherein in step (a) said hydroxide is a member selected from the group consisting of sodium hydroxide, potassium hydroxide, and calcium hydroxide.

3. The method as recited in claim 1 where in step (a) said hydroxide is a member selected from the group consisting of sodium hydroxide, potassium hydroxide, and calcium hydroxide where said hydroxide is contained in said aqueous solution in an amount of form about 1 to about 500 ppm.

4. The method as recited in claim 1 where in step (a) said polysaccharide is complexed with a polyvalent metal ion selected from a member of the group consisting of trivalent phosphorus, scandium, titanium, vanadium, chromium, manganese, iron, cobalt, copper, aluminum, arsenic, yttrium, zirconium, niobium, cadmium, tin, antimony, lanthanum, hafnium, tantalum, lead, and mixtures thereof.

5. The method as recited in claim 1 where in step (a) said polysaccharide is complexed with a polyvalent metal ion selected from a member of the group consisting of trivalent phosphorus, scandium, titantium, vanadium, chromium, manganese, iron, cobalt, copper, aluminum, arsenic, yttrium, zirconium, niobium, cadmium, tin, antimony, lanthanum, hafnium, tantalum, lead, and mixtures thereof where said member is contained in said aqueous solution in an amount of from about 20 to about 2,000 ppm.

6. The method as recited in claim 1 where in step (a) said polysaccharide is contained in said water in an amount of from about 1,000 to about 15,000 ppm.

7. The method as recited in claim 1 where in step (c) shearing occurs when said gel is injected into said first zone and subsequent thereto said gel is substantially rehealed and reformed so as to become effective in closing pores within said first zone within about 2 hours.

8. The method as recited in claim 1 where in step (c) gelation occurs within about 4 hours.

9. The method as recited in claim 1 where in step (d) said fluid is selected from the group consisting of carbon dioxide, water, or steam, and mixtures thereof.

10. A method for recovering hydrocarbonaceous fluids from formation penetrated by at least one injection well and fluidly communicating with at least one production well which formation contains a swept and an unswept zone comprising:
(a) mixing into water a water thicknening amount of a water soluble scleroglucan polysacccharide and a substantially small amount of an alkaline metal hydroxide sufficient to cause gelation within a substantially effective time period then,
(b) complexing said polysaccharide with an amount of a water-soluble compound of a polyvalent metal ion sufficient to cause gelation of said polysaccharide thereby forming a stable gel;
(c) injecting via said injection well into said swept zone said gel which gelates sufficiently to close pores in said first zone;
(d) injecting via said injection well into said unswept zone a gaseous fluid in an amount sufficient to remove hydrocarbonaceous fluids from said second zone which fluid is diverted from said swept zone containing said closed pores; and
(e) recovering hydrocarbonaceous fluids and gaseous fluids from said second zone via said production well.

11. The method as recited in claim 9 where in step (A) said hydroxide is a member selected from the group consisting of sodium hydroxide, potassium hydroxide, and calcium hydroxide.

12. The method as recited in claim 9 where in step (a) said hydroxide is a member selected from the group consisting of sodium hydroxide, potassium hydroxide, and calcium hydroxide where said hydroxide is contained in said aqueous solution in an amount of from about 1 to about 500 ppm.

13. The method as recited in claim 10 where in step (a) said polysaccharide is complexed with a polyvalent metal ion selected from a member of the group consisting of trivalent phosphorus, scandium, titantium, vanadium, chromium, manganese, iron, cobalt, copper, aluminum, arsenic, yttrium, zirconium, niobium, cadmium, tin, antimony, lanthanum, hafnium, tantalum, lead, and mixtures thereof.

14. The method as recited in claim 10 where in step (a) said polysaccharide is complexed with a polyvalent metal ion selected from a member of the group consisting of trivalent phosphorus, scandium, titantium, vanadium, chromium, manganese, iron, cobalt, copper, aluminum, arsenic, yttrium, zirconium, niobium, cadmium, tin, antimony, lanthanum, hafnium, tantalum, lead, and mixtures thereof where said member is contained in said aqueous solution in an amount of from about 20 to about 2,000 ppm.

15. The method as recited in claim 10 where in step (c) shearing occurs when said gel is injected into said first zone and subsequent thereto said gel is substantially rehealed and reformed so as to close pores in said first zone within about 2 hours.

16. The method as recited in claim 10 where in step (b) gelation occurs within about 4 hours.

17. The method as recited in claim 10 where in step (a) said polysaccharide is contained in said water in an amount of form about 1,000 to about 4,000 ppm.

18. The method as recited in claim 10 where in step (d) said gaseous fluid comprises carbon dioxide or steam and mixtures thereof.

19. A carbon dioxide fluid drive method for minimizing gravity overide in a hydrocarbonaceous fluid bearing formation penetrated by at least one injection well and fluidly communicating with at least one production well which formation contains a swept and an unswept zone comprising:
(a) mixing into water a water thickening amount of a water soluble scleroglucan polysaccharide and a substantially small of an alkaline metal hydroxide sufficient to cause gelatin within a substantially effective time period then;
(b) complexing said polysaccharide with an amount of a water-soluble compound of a polyvalent metal ion sufficient to cause gelation of said polysaccharide thereby forming a stable gel;
(c) injecting via said injection well into said swept zone said gel which gelates sufficiently to close pres in said swept zone;
(d) injecting via said injection well into said unswept zone a gaseous fluid in an amount sufficient to remove hydrocarbon fluids from said unswept zone which carbon dioxide is diverted from said swept zone containing said closed pores;
(e) recovering hydrocarbonaceous fluids and carbon dioxide from said unswept zone via said production well; and
(f) recycling said recovered carbon dioxide into said formation to recover additional hydrocarbonaceous fluids.

20. The method as recited in claim 19 where in step (a) said hydroxide is a member selected from the group consisting of sodium hydroxide, potassium hydroxide, and calcium hydroxide.

21. The method as recited in claim 19 where in step (a) said hydroxide is a member selected from the group consisting of sodium hydroxide, potassium hydroxide, and calcium hydroxide where said hydroxide is contained in said aqueous solution in an amount of from about 1 to about 500 ppm.

22. The method as recited in claim 19 where in step (a) said polysaccharide is complexed with a polyvalent metal ion selected from a member of the group consisting of trivalent phosphorus, scandium, titantium, vanadium, chromium, manganese, iron, cobalt, copper, aluminum, arsenic, yttrium, zirconium, niobium, cadmium, tin, antimony, lanthanum, hafnium, tantalum, lead, and mixtures thereof.

23. The method as recited in claim 19 where in step (a) said polysaccharide is complexed with a polyvalent metal ion selected from a member of the group consisting of trivalent phosphorus, scandium, titantium, vanadium, chromium, manganese, iron, cobalt, copper, aluminum, arsenic, yttrium, zirconium, niobium, cadmium, tin, antimony, lanthanum, hafnium, tantalum, lead, and mixtures thereof there said member is contained in said aqueous solution in an amount of from about 20 to about 2,000 ppm.

24. The method as recited in claim 19 where in step (a) shearing occurs when said gel is injected into said swept zone and subsequent thereto said gel is substantially rehealed and reformed so as to close pores in said swept zone within about 2 hours.

25. The method as recited in claim 19 where in step (a) gelation occurs within about 4 hours.

26. The method as recited in claim 19 where in step (a) said polysaccharide is contained in said water in an amount of from about 1,000 to about 4,000 ppm.

* * * * *